Figure 1:
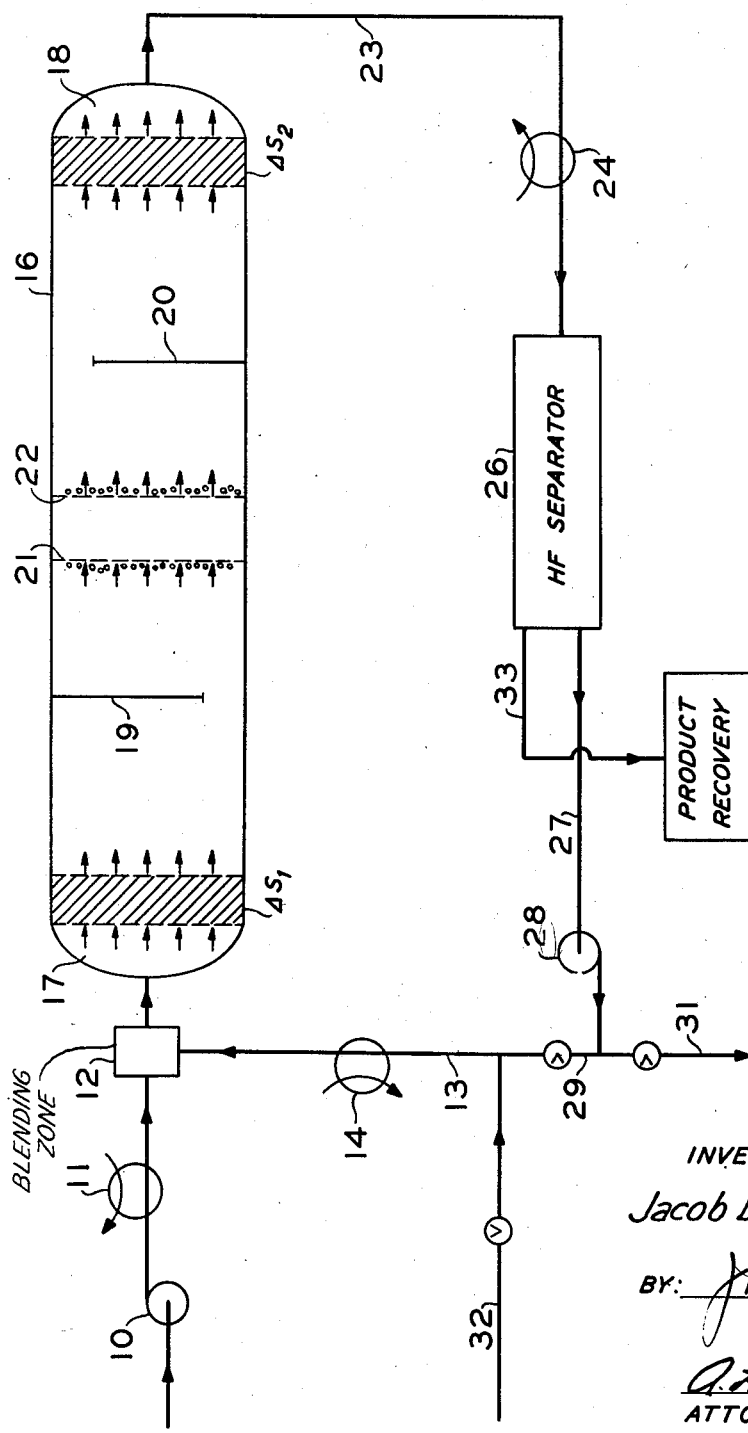

Oct. 31, 1950          J. D. KEMP          2,527,825
MANUFACTURE OF XYLENE ISOMERS

Filed June 13, 1947          3 Sheets-Sheet 1

INVENTOR
*Jacob D. Kemp*

BY:

ATTORNEYS

Oct. 31, 1950 J. D. KEMP 2,527,825
MANUFACTURE OF XYLENE ISOMERS
Filed June 13, 1947 3 Sheets-Sheet 2

INVENTOR
Jacob D. Kemp
BY
ATTORNEYS

Patented Oct. 31, 1950

2,527,825

UNITED STATES PATENT OFFICE 2,527,825

MANUFACTURE OF XYLENE ISOMERS

Jacob D. Kemp, Richmond, Calif., assignor to California Research Corporation, San Francisco, Calif., a corporation of Delaware Application June 13, 1947, Serial No. 754,574

5 Claims. (Cl. 260—668)

This invention relates to a new and improved process for effecting formation of substituted aromatic hydrocarbons with hydrogen fluoride catalysis, and, more particularly, to conversions involving formation of alkyl aromatic compounds by alkyl transfer reactions and especially by isomerization.

Hydrogen fluoride catalysis of substituted aromatic hydrocarbon reactions is known, but since hydrogen fluoride is immiscible with such hydrocarbons, it has been found necessary to subject the reaction mixture to vigorous agitation in order to obtain adequate conversions in such catalytic reactions.

In general organic reactions are slow, and hydrogen fluoride catalyzed aromatic hydrocarbon conversions are no exception. This general characteristic necessitates vigorous agitation throughout a relatively long reaction period which, in turn, means that relatively large volumes of reactants and hydrogen fluoride must be agitated in order to insure adequate contacting of the hydrocarbon oil phase with the immiscible hydrogen fluoride catalyst phase.

Suitable agitation equipment which will insure adequate conversion within reasonable time intervals with hydrogen fluoride catalysis involves expensive equipment, but, more important, a material increase in the hazards of operation. A rotating agitator shaft running into an otherwise sealed reactor introduces significant dangers to operating personnel and equipment, since failure of a shaft bearing and/or shaft sealing devices permits escape of the extremely hazardous chemical, hydrogen fluoride. Large reactors with large volumes of reagents are involved, as previously explained, and elimination or reduction of this hazard from agitation and agitators has long been recognized as highly desirable, but, nevertheless, large agitators apparently have been accepted as unavoidable in HF catalysis for conversion of normally immiscible aromatic hydrocarbons. Power consumption necessary to maintain large volumes of reactants in a high degree of agitation is high but likewise has been accepted as necessary.

An object of this invention is to provide a new and improved process for effecting HF catalysis of aromatic hydrocarbon conversions whereby hazards to operating personnel are materially reduced.

Another object is to provide a process for efficient catalysis of aromatic hydrocarbon conversions with a normally immiscible hydrogen fluoride catalyst in a simple sealed reactor and without the necessity for a long residence time in a correspondingly large volume agitated reaction zone.

Figures 2, 3:
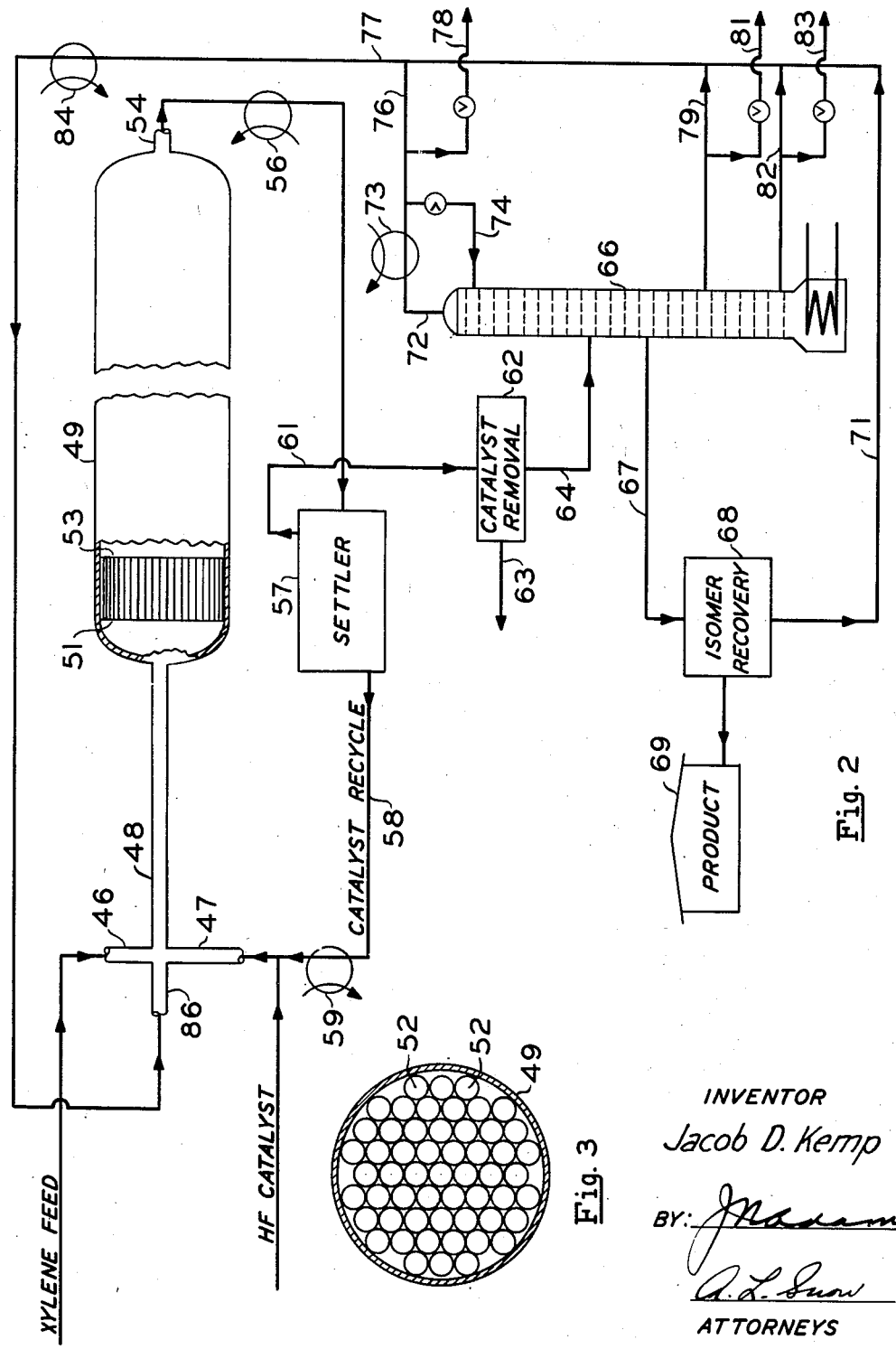
Figure 4:
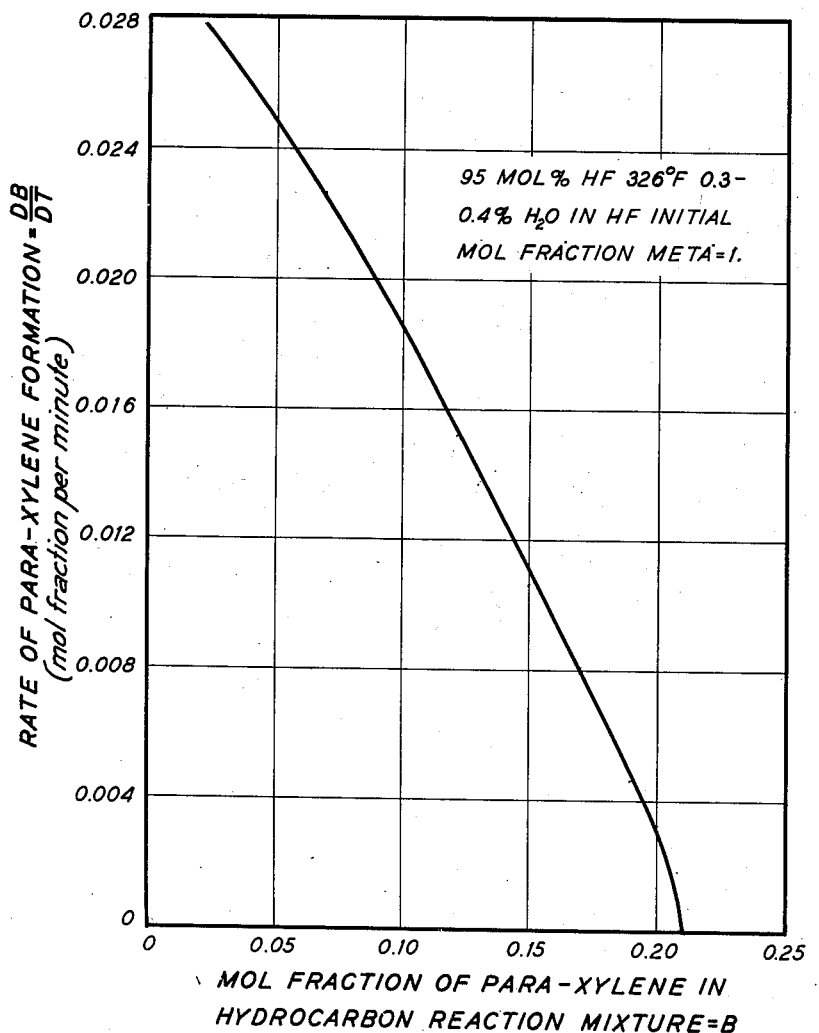

Other objects and advantages will be apparent from the following description and drawing, wherein Figure 1 is a diagrammatic flow sheet of a process and apparatus illustrating the principles of this invention. Figures 2 and 3 show an alternative form of process and apparatus; and Figure 4 is a graph illustrating the detrimental effects on conversion rate of mixing reaction feed with reaction product in the process of this invention.

It has been discovered that the foregoing objects and advantages can be obtained by continuously passing the hydrocarbon and hydrogen fluoride catalyst through a relatively small volume solubilizing or blending zone to form a substantially homogeneous liquid phase mixture of hydrogen fluoride and hydrocarbon feed, then passing said single phase liquid mixture through a relatively large volume single phase liquid reaction zone, and maintaining a differential in hydrocarbon composition through said reaction zone by preventing substantial dilution of hydrocarbon at the inlet with converted hydrocarbon at the outlet of said reaction zone. The step of maintaining a differential in hydrocarbon composition from inlet to outlet of the reaction zone, despite the fact that only a single phase reaction system is utilized, accomplishes several major objectives, including (1) reduction of loss from relatively slow side reactions, (2) an increase in the overall conversion rate through the reaction zone resulting in a decrease in the necessary reaction time for a given conversion, (3) elimination of the previously noted hazards attending agitation of hydrogen fluoride in large volume reactors, and (4) good reaction control.

Reference to Figure 1 of the drawing will reveal one preferred form of process and apparatus for practicing the invention wherein hydrocarbon feed passes through inlet pump 10 and heat exchanger 11 to blending zone 12, which also receives hydrogen fluoride catalyst admitted by way of inlet line 13 and heat exchanger 14. The hydrocarbon feed and hydrogen fluoride catalyst are solubilized or blended in zone 12 to form a single phase reaction mixture. Various solubilizing or blending procedures may be utilized, depending upon the hydrocarbon reactants, as hereinafter discussed in more detail. When the feed is a xylene fraction, blending can be effected very simply.

The hydrogen fluoride catalyst and hydrocarbon components are blended or solubilized in zone 12 to form a single phase by any suitable mixing device, preferably without mechanical agitation. Known fluid injection methods of mixing normally suffice, although mechanical agitators are not precluded, since zone 12 is of relatively small volume (e. g., 1/10 to 1/100 the volume of the reactor or less) and hazards of large volume mechanical agitators are not involved.

Any side reactions which may occur at temperature ranges lower than those preferred for the desired hydrocarbon conversions can be avoided or reduced, as here shown, by raising the hydrocarbon feed and the hydrogen fluoride catalyst to reaction temperature prior to blending in zone 12. Heat exchangers 11 and 14 serve this purpose. Accordingly, the solubilized and blended reaction mixture leaves zone 12 in single phase at reaction temperature.

The single phase mixture next flows to reactor 16 constructed and arranged to prevent substantial dilution of hydrocarbon at the inlet feed end 17 with converted hydrocarbons at the outlet end 18. As here shown, reactor 16 is in the form of a sealed vessel constructed and arranged to provide a substantially quiescent reaction zone with a differential in hydrocarbon composition from inlet 17 to outlet 18. Baffle plates 19 and 20, respectively, serve to compartmentalize reactor 16 and insure prevention of cross currents which might tend to blur or obliterate the desired differentials in hydrocarbon composition.

The significance of differential in hydrocarbon compositions in the single phase reaction zone will be better understood by reference to Figure 4 wherein, for illustrative purposes, the relationship between isomerization rates for conversion of meta xylene to para xylene is plotted against concentration of para xylene in the reaction mixture. From the graph of Figure 4, it is clear that the rate of conversion of meta xylene to para xylene as measured by the rate of formation of para xylene drops rapidly with increasing para content of the feed. If, for example, reactor 16 were operated with complete mixing and at 90% conversion to theoretical equilibrium concentrations, the reaction rate would be about .005, whereas for the same conversion and maintenance of a differential in hydrocarbon composition from .025 para at inlet to 90% of theoretical equilibrium at outlet, the reaction rate is the statistical average of the high rate (.028) for low para with the low rate (.005) for high para content and from the graph would be about three times as high in the differential or quiescent reaction zone as in the mixed reaction zone.

In accordance with the invention, dilution of feed with later stage reaction mixtures may be avoided by maintaining streamline, as distinguished from turbulent, flow through the reaction zone. The desired state of differential in hydrocarbon composition through the reaction zone may be viewed either as if in instantaneous static state or in a dynamic stabilized state. Thus, at any given time fluid particles flowing in a straight line from a position represented by dotted line 21 in Fig. 1 are not mixed with fluid particles in a position represented by dotted line 22. (In the isomerization of meta xylene for example the particles in position 22 have a higher para content than those in position 21 by reason of their longer reaction time.) At any given instant a series of fluid particles extending from inlet to outlet and spaced along the path of fluid flow would show successive differential increases in content of converted hydrocarbons.

From a dynamic viewpoint, the single phase reaction mixture may be visualized as continuously entering and leaving a differential reaction zone $\Delta S_1$ (shown in Fig. 1 as a cross-hatched vertical strip) without mixing of inlet feed with outlet reactants except as $\Delta S_1$ becomes very small. Thus, the inlet and outlet boundaries of $\Delta S_1$ show a change or differential in hydrocarbon composition. When plotted against position in the reactor, changes in hydrocarbon composition throughout the length of the reactor would approximate the shape of the curve of Fig. 4. This affords maximum overall conversion capacity and yield for any given set of operating conditions; that is to say, the change in hydrocarbon composition from $\Delta S_1$ at inlet 17 to $\Delta S_2$ at outlet 18 corresponds to the conversion obtained in the reaction zone.

It should be understood that as $\Delta S$ approaches O, mixing occurs, since individual molecules are known to move with respect to each other. However, it is equally clear that no mixing occurs between $\Delta S_1$ at the inlet and $\Delta S_2$ at the outlet of the overall reaction zone. Likewise, by providing a continuous series of small reaction zones where mixing may take place within each zone but not substantially between different zones of the series, a differential in hydrocarbon composition can be maintained and the process of this invention utilized since, in the aggregate, the series of small zones provide an overall reaction zone in which feed hydrocarbons are not diluted or mixed with subsequently formed hydrocarbons at or substantially nearer the exit side.

Returning to the description of Figure 1, the reaction mixture flows through sealed reactor 16 without agitation while being maintained in single phase and under desired reaction conditions. Hydrocarbon effluent, together with hydrogen fluoride catalyst, is withdrawn through outlet line 23 by way of cooler 24 to separation stage 26. In the case of xylene isomerization, cooler 24 serves to break the reaction mixture into two phases by reduction of temperature to a point below that of miscibility of hydrocarbon with hydrogen fluoride. Thus, an upper oil phase saturated with hydrogen fluoride and a lower hydrogen fluoride phase saturated with xylenes are formed. The hydrogen fluoride phase may be separated from the oil phase at 26 and discharged through outlet line 27, pump 28, through valve-controlled line 29, to be recycled to the isomerization zone or removed from the system via line 31 as desired. Fresh catalyst may be introduced to the system by means of inlet line 32.

Hydrocarbon conversion products are withdrawn from separator 26 by line 33 and recovered. In the production of para xylene, for example, this recovery may be effected by selective crystallization of the para xylene, filtration of crystals from the mother liquor and return of mother liquor to the isomerization feed for additional conversion of isomers to the desired product.

As previously stated, the invention is applicable to various aromatic hydrocarbon conversion reactions in which hydrogen fluoride is an effective catalyst. Exemplary reactions are isomerization, disproportionation, alkylation and de-alkylation. The invention can be applied with particular advantage in the isomerization of alkyl benzenes, especially xylenes, since it has been discovered that hydrogen fluoride and xylene feeds can be solubilized and rendered miscible merely by raising the temperature thereof to 300 to 400° F., for example, and that after blending at these elevated temperatures and under sufficient pressure to maintain both the hydrogen fluoride and the hydrocarbon in liquid phase, the homogeneous reaction mixture can again be readily separated upon completion of the reaction by merely cooling to a temperature below that of complete miscibility, for example, 100° F. or lower. The miscibility of xylenes hydrocarbon phase with hydrogen fluoride at elevated temperatures is not destroyed by large amounts of preferred diluents for the isomerization reaction, such as benzene, toluene and ethyl benzene, or by the presence of higher aromatic disproportionation products, such as ethyl toluene or ethyl xylene.

Suitable reaction conditions for the isomerization of xylenes will be apparent from the following: A temperature of above about 250° F. is operative, the upper temperature limit for isomerization of xylenes being primarily determined by permissible pressures necessary to maintain liquid phase. Generally, temperatures higher than 400° F. are not warranted and tend to introduce or increase side reactions. Less severe conditions, i. e., lower temperatures or lower contact times, or both, are acceptable and even preferable for isomerization of ethyl and higher molecular weight aliphatic side chains on a benzene nucleus. Proportions of catalyst and hydrocarbon may be adjusted to obtain miscibility at reaction temperatures. Ethyl groups are much more easily isomerized at the aromatic nucleus than are methyl groups, and temperatures below 250° F. will be found suitable for such higher alkyl chains, provided suitable precautions are taken to insure blending of the hydrogen fluoride catalyst with the hydrocarbon feed to produce a single phase reaction mixture. In the isomerization of a methyl group at the nucleus, 300–375° F. is desirable, and a temperature of from about 310–350° F. has been found preferable for the isomerization of xylenes with anhydrous hydrogen fluoride. Contact time (that is, residence time at reaction temperature in single phase under isomerizing conditions) for a given conversion in the isomerization reaction is a function of temperature, catalyst concentration and feed composition. Ordinarily, a minimum of about 1 minute will be required, and the maximum contact time is determined primarily by permissible plant size, although the danger of increasing relatively slow side reactions is increased by inordinately long contacts. Generally, thirty minutes is a maximum and five to twenty minutes is presently regarded as optimum for isomerization of xylenes with anhydrous hydrogen fluoride in the proportions and at the temperatures herein recommended.

Catalyst concentration in the reaction mixture may be varied widely. Although not critical to operativeness, relatively high proportions of hydrogen fluoride are necessary to effect the homogeneous isomerization rapidly, for example, from about 60 to 85 volume per cent of anhydrous HF based on the total reaction mixture is preferred. Smaller amounts are operable, but at least 40% by volume is desirable for xylene isomerization under the conditions herein recommended. The maximum proportion of catalyst is determined primarily by acceptable plant size, but more than 90% by volume based on total reaction mixture ordinarily is not warranted.

Commercial anhydrous hydrogen fluoride may contain up to about 0.5% water, and such anhydrous hydrogen fluoride is preferred as a catalyst, although small amounts of water, for example, 2 to 5%, are not precluded. Water in the hydrogen fluoride reduces the activity of the catalyst by decreasing the mol fraction of HF, and consequently reduces either the reaction rate or the capacity of the system for hydrocarbon if the amount of catalyst is increased to yield an equivalent HF mol fraction. An additional loss of 35% in activity has been noted for HF containing 2 to 4% water when compared to anhydrous HF in an equivalent mol fraction.

Likewise, the presence of water tends to decrease miscibility of the hydrogen fluoride catalyst with the hydrocarbon. Both the lower miscibility and the lower catalytic activity may be compensated for to some extent by raising the temperature of operations.

The presence of a diluent miscible with the reaction mixture selectively promotes the isomerization reaction, i. e., the same fractional conversions of meta or ortho xylene to para xylene, for example, are obtained in diluted solutions as in more concentrated ones under otherwise comparable conditions. Second order reactions, such as disproportionation, are selectively reduced by dilution of the reaction mixture. Additionally, it has been found that by using toluene as a diluent, losses by disproportionation of xylenes are reduced over and above the reduction obtained with substantially inert diluents, such as propane and cyclopentane. For these reasons, it is preferred to effect the isomerization reaction in the presence of a diluent, most desirably toluene with xylene isomerization. For other dialkyl benzenes, the preferred diluent is a mono alkyl benzene in which the alkyl group is like an alkyl group of the dialkyl benzene being isomerized. Suitable proportions of diluent are in excess of 10% and desirably in the order of 50% by volume based on the total feed. In disproportionation and alkylation reactions blending agents or diluents will be found desirable, in some instances, to increase miscibility of the hydrocarbon phase with hydrogen fluoride catalyst.

Pressure is not critical except that it should be sufficiently high to maintain reactants and catalyst in liquid phase. In order to maintain catalyst activity or at least to keep and control reduction in activity to a minimum, the hydrocarbon feed and diluent desirably should be dried prior to contacting with the hydrogen fluoride catalyst. Any suitable drying process may be adopted, for example, by contacting the hydrocarbon feed with bauxite or other porous adsorbents for water.

Other examples of aromatic hydrocarbon conversions with hydrogen fluoride catalysis to which the invention is applicable are illustrated by the following: benzene, toluene or xylene may be alkylated with an olefin under conditions such that the olefin, aromatic and catalyst form a single phase. The alkylation product may or may not be soluble in the reaction phase, depending upon its relative molecular weight. When the reaction product is soluble, a process such as shown in the drawing will be utilized. When the alkylated aromatic product is immiscible with the hydrogen fluoride phase, it may be allowed to separate and be removed without the necessity of markedly cooling the reaction mixture below reaction temperatures.

Other alkylation reactions, such as alkylation of isobutane with an olefin, for example, isobutene, are not precluded. However, higher pressures and/or a blending agent or diluent will be required in order to obtain miscibility and a single phase reaction at alkylation temperatures of 50 to 250° F. Thus, tertiary butyl benzene may be used as a diluent or as an alkylation agent (the tertiary butyl group being transferred to the isobutane by disproportionation) for isobutane with or without isobutene in the hydrocarbon feed.

De-alkylation of alkyl aromatics, such as ethyl xylene is embraced by the present invention and may be effected under conditions such as previously described with respect to isomerization of xylenes.

Disproportionation reactions are advantageously effected in single phase by the process of this invention. Thus, xylenes may be disproportionated in single phase by operating in the higher temperature brackets discussed for the isomerization of xylenes but by omitting diluents and by separating the disproportionation products while promoting the disproportionation reaction with recycle of xylenes from the reaction effluent back to reaction feed.

The utter simplicity of suitable apparatus for effecting hydrogen fluoride catalysis and the resulting increase in the safety to operating personnel which the present invention affords are further illustrated by Figure 2 of the drawing, wherein a xylene feed, preferably containing diluent, heated to isomerization reaction temperature is introduced into the isomerization system by way of inlet 46 and is blended with hydrogen fluoride catalyst, also at reaction temperature, admitted by way of line 47. As here shown blending is effected and a single phase reaction system formed by producing turbulent flow of the mixture through a narrow elongated chamber or conduit 48. Turbulent flow may be obtained by passing the liquid phase mixture at a relatively high velocity through conduit 48, for example, at a velocity which exceeds the critical velocity below which non-turbulent flow occurs. Such critical velocities are a well-understood phenomenon in hydraulics and can be readily determined for any given case by those skilled in the art of hydraulic flow. Alternatively or additionally suitable vanes may be provided within or on the inner walls of conduit 48 to produce or increase the degree of turbulence. After complete mixing and blending in conduit 48 the liquid phase reaction mixture flows to reaction chamber 49 where non-turbulent flow is maintained in order to obtain a differential in hydrocarbon composition extending from inlet to outlet of the reaction chamber.

It will be noted that mixing conduit 48 is relatively small in volume which accomplishes the double purpose of yielding high velocities and turbulent flow for a given volume of feed through the entire system and also minimizes side reactions and reduction in reaction rates by keeping residence time in the mixing zone relatively short. By contrast, reaction chamber 49 is large in diameter and volume to reduce the velocity of flow of the reaction mixture to approximately stream-line rates and to afford a reaction residence time sufficient to give the desired conversions.

The efficiency of the reaction zone is increased and a near approximation of stream-line flow is obtained in the apparatus and process of Fig. 2 by means of an eddy eliminator which serves to straighten the lines of flow in reaction chamber 49 and thereby increase the differential in hydrocarbon composition. As here shown the eddy eliminator 51 is in the form of a multiplicity of tubes 52 of relatively small diameter. These tubes are shown in the detailed cross-section of Fig. 3 and will be seen to fill the reaction chamber in the eddy elimination zone. Thus, reaction mixture entering the inlet of chamber 49 at relatively high velocities is immediately slowed down by reason of the increase in cross section area from that of mixing conduit 48 to that of reaction chamber 49. However, the momentum or impulse of the high velocity reaction mixture entering chamber 49 tends to produce eddy currents and thereby short-circuit or obliterate differentials in hydrocarbon composition which it is desired to maintain in the reaction chamber. These eddies are smoothed out and eliminated by flow of the reaction mixture through the series of parallel tubes 52 and the reaction mixture proceeds in substantially stream-line flow from the outlet 53 of eddy elimination tubes 52 through the remainder of chamber 49.

The isomerized xylenes pass from reaction chamber 49 by way of outlet conduit 54 and cooler 56 to the settler 57. Reduction of the temperature of the reaction mixture by cooler 56 should be below the temperature of complete miscibility, for example, 100° F. or lower and thereby cause formation of two phases in settler 57. The hydrogen fluoride catalyst phase is then recycled via line 58 and preheater 59 to catalyst inlet line 47.

The isomerized hydrocarbon phase in settler 57 passes through outlet 61 to catalyst removal unit 62. Residual hydrogen fluoride catalyst present in the hydrocarbon phase is eliminated in any suitable manner, as for example by distillation and caustic washing. The separated catalyst or neutralization products are withdrawn as indicated by line 63. Purified isomerized hydrocarbon mixture flows from catalyst removal unit 62 by way of line 64 to fractionating column 66.

The hydrocarbon reaction mixture is fractionated as here indicated into four principal types of components: (1) an overhead fraction boiling below the xylene isomers and comprising hydrocarbon diluent, if any, together with disproportionation products which are more volatile than the xylenes, for example, toluene and benzene; (2) the mixture of isomeric xylenes formed in the reaction zone; (3) xylene disproportionation products in the $C_9$ molecular weight range; and (4) xylene disproportionation products in the $C_{10}$ and higher molecular weight range.

The mixture of xylene isomers is withdrawn from fractionating column 66 by way of line 67 to isomer recovery unit 68. Usually isomer recovery unit 68 will comprise a suitable system for separating one or more of the xylene isomers as, for example, for crystallizing para xylene from the equilibrium mixture of xylene isomers and filtering off the selectively formed para xylene crystals. The xylene product is passed to storage 69. Other isomeric xylenes as, for example, a xylene mixture rich in ortho and meta isomers may be recycled to the xylene feed by way of xylene return line 71.

Diluent (toluene, propane, cyclopentane or cyclohexane for example) together with xylene disproportionation products boiling below the xylenes themselves are removed from fractionating column 66 by way of overhead outlet 72, and condenser 73. A portion of the overhead may be returned through valve-controlled reflux line 74 to improve the fractionation in column 66. Preferably the diluent and lighter disproportionation products are recycled at least in part to the reaction zone and as shown flow by way of line 76 to recycle header 77. Desired portions of the diluent or disproportionation products may be removed by way of valve-controlled line 78.

$C_9$ disproportionation products of the xylenes flow from fractionating column 66 by way of line 79 to recycle header 77. Any desired quantity of these disproportionation products may be removed from the system through valve-controlled line 81. Likewise, $C_{10}$ and higher disproportionation products of the xylenes are returned to recycle header 77 by way of line 82 and desired quantities are removed through valve-controlled line 83. The various recycle stocks combined in header 77 are brought to reaction temperature by preheater 84 and flow by way of inlet 86 with the xylene feed and hydrogen fluoride catalyst through mixer 48. These recycle hydrocarbons serve to suppress disproportionation and to promote selective formation of the desired xylene isomer or isomers.

The terms "alkyl transfer" or "alkyl transfer reaction" are utilized in the appended claims to embrace generic reactions in which an alkyl group is shifted in position on an aromatic ring (as in isomerization) or is removed from the ring, or is added to the ring (as in disproportionation for instance).

Obviously many modifications and variations of the invention as hereinbefore set forth may be made without departing from the spirit and scope thereof, and only such limitations should be imposed as are indicated in the appended claims.

I claim:

1. A continuous process for isomerizing a xylene comprising the steps of blending a xylene charging stock with anhydrous liquid hydrogen fluoride, at a temperature of 250 to 400° F., the proportion of said hydrogen fluoride being equal to 40 to 90% of the total liquid mixture, thus forming a single liquid phase blend, thereafter immediately passing said blend through a reaction zone in non-turbulent flow, whereby the mixture downstream is substantially unmixed with the upstream reaction mixture, while maintaining the temperature at about 250 to 400° F. in said reaction zone.

2. The method as defined in claim 1 wherein the xylene charging stock and hydrogen fluoride are blended and passed through the reaction zone at a temperature in the range about 310° F. to 350° F.

3. The method as defined in claim 1 wherein the proportion of hydrogen fluoride is equal to 60 to 85 volume per cent of the total liquid mixture.

4. The method as defined in claim 1 wherein the proportion of hydrogen fluoride is equal to 60 to 85 volume per cent of the total liquid mixture and the xylene charging stock and hydrogen fluoride are blended and passed through the reaction zone at a temperature in the range about 310 F. to 350° F.

5. The method as defined in claim 1, wherein the liquid hydrogen fluoride contains minor amounts of water not exceeding 5%.

JACOB D. KEMP.

REFERENCES CITED

The following references are of record in the file of this patent:

UNITED STATES PATENTS

| Number | Name | Date |
| --- | --- | --- |
| 2,379,368 | Matuszak | June 26, 1945 |
| 2,403,785 | Britton et al. | July 9, 1946 |
| 2,416,184 | Lee et al. | Feb. 18, 1947 |
| 2,425,559 | Passino et al. | Aug. 12, 1947 |